US006444156B1

(12) United States Patent
Schwarz et al.

(10) Patent No.: US 6,444,156 B1
(45) **Date of Patent: *Sep. 3, 2002**

(54) METHOD OF MANUFACTURING GEL CANDLES HAVING NON-METAL CORE WICKS

(75) Inventors: Ralph G. Schwarz, Racine, WI (US); Shannon Julia Ebner, Chicago, IL (US); Michael J. Rohrer, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,117

(22) Filed: Jul. 17, 2000

Related U.S. Application Data

(63) Continuation-in-part of application No. 09/141,864, filed on Aug. 28, 1998, now Pat. No. 6,090,331.

(51) Int. Cl.[7] ......................... B29C 39/10; B29C 71/02; F23D 3/08; F23D 3/28

(52) U.S. Cl. .................... 264/405; 264/271.1; 264/275; 264/319; 425/3; 425/803; 431/288; 44/275

(58) Field of Search ................................ 264/405, 319, 264/275, 271.1, 108, 348; 425/3, 93, 117, 275, 468, 803; 431/288; 44/275

(56) References Cited

U.S. PATENT DOCUMENTS

| | | | |
|---|---|---|---|
| 3,724,982 A | 4/1973 | Davis | 425/117 |
| 3,759,478 A | 9/1973 | Schmitt et al. | 249/93 |
| 3,797,990 A | 3/1974 | Rogers et al. | 431/291 |
| 3,799,492 A | 3/1974 | O'Laughlin | 249/94 |
| 3,881,682 A | 5/1975 | Kin | 249/94 |
| 4,320,575 A | 3/1982 | Karlsson | 29/788 |
| 5,578,089 A | 11/1996 | Elsamaloty | 44/275 |
| 5,843,194 A | 12/1998 | Spaulding | 44/275 |
| 5,879,694 A | 3/1999 | Morrison et al. | 424/405 |
| 5,882,363 A | 3/1999 | Spaulding et al. | 44/275 |

FOREIGN PATENT DOCUMENTS

| | | |
|---|---|---|
| DE | 3335146 A1 | 4/1985 |
| DE | 3620607 Al | 4/1987 |
| JP | 815864 | 6/1996 |
| JP | 7216384 | 8/1996 |
| WO | WO97/08282 A1 | 3/1997 |

*Primary Examiner*—Jan H. Silbaugh
*Assistant Examiner*—Michael I. Poe

(57) ABSTRACT

A method of manufacturing a gel candle having a non-metal core wick that stands upright and is not bent, wilted, or submerged in the gel candle body. In one aspect, the method includes providing a gel-forming liquid composition in a candle container having a longitudinal axis running therethrough, the gel-forming liquid composition having an average temperature of between about 195° F. and about 230° F.; thereafter, inserting a wick-clip having a non-metal core wick into the composition in the container when the temperature of the composition substantially in the center of the container is between about 160° F. and about 195° F.; and drawing the wick-clip through the composition and positioning the wick-clip in the container using a magnetic material. After the positioning step, the non-metal core wick is substantially aligned with the longitudinal axis of the container. In another aspect, the method can further include cooling the composition in the container. In yet another aspect, the wick-clip having a non-metal core wick is inserted into and drawn through the composition in the container before the composition in the container begins to transform into a gel. In still another aspect, the method may additionally comprise placing a guide on the container to help guide the non-metal core wick through the gel-forming liquid composition when the wick is inserted during the inserting step.

29 Claims, 3 Drawing Sheets

METHOD OF MANUFACTURING GEL CANDLES HAVING NON-METAL CORE WICKS

This application is a continuation-in-part of U.S. application Ser. No. 09/141,864, filed Aug. 28, 1998, now U.S. Pat. No. 6,090,331.

BACKGROUND OF THE INVENTION

1. Field of the Invention

This invention relates to a method of manufacturing gel candles, and in particular, to an improved method of manufacturing gel candles having less rigid, non-metal core wicks that stand upright and are not bent, wilted, or submerged in the body of the gel candle.

2. The Related Art

In this modern age of electricity, candles are no longer employed as principal sources of light, but instead are used more for ornamental, decorative, or personal reasons. The candle making art, therefore, has developed a wide variety of candle types to satisfy and fulfill consumer preferences and desires. One such candle type is the gel candle. Gel candles have gained widespread popularity in recent years, perhaps due in large part to the aesthetic appeal of transparent or translucent gels, which can be housed in containers of various shapes, sizes, and designs.

Gel candles are typically made according to a two stage process: a batch stage in which a gel-forming liquid composition is prepared in a batch (i.e., a container or vessel), followed by a continuous filling stage in which candle containers are filled with the gel-forming liquid composition from the batch. As used herein, "gel-forming liquid composition" generally refers to any colloidal dispersion that transforms into a gel state upon cooling, and "gel state" or "gel" generally refers to a colloidal dispersion that has attained a structure that prevents the dispersion from flowing.

The batch stage consists generally of heating and mixing starting materials of a gel-forming liquid composition suitable for use in forming candles in a batch at relatively high temperatures, typically about 250° F. or higher, until a homogeneous, gel-forming liquid composition is formed. The temperature of the gel-forming liquid composition is then lowered to between about 195° F. and about 230° F., and maintained within this temperature range in the batch throughout the filling stage, to prevent gellation of the composition itself in the batch.

FIG. 1 generally depicts the filling stage currently employed in the manufacture of gel candles. Referring to this figure, a wick-clip 12 having a metal core wick 13 is first placed in a candle container 11. As used herein, "metal core wick" means a wick having a metal core, such as zinc, surrounded by cotton or paper fibers; whereas the term "non-metal core wick" means either a wick having a paper or cotton core surrounded by cotton or paper fibers, a cotton fiber wick, a paper fiber wick, or an equivalent. Although most wicks have a microcrystalline wax coating as an outermost coating, such a coating is not necessarily required for gel candles. A magnet (not shown) located underneath container 11 may be used to center wick-clip 12 on the bottom of the container 11.

A gel-forming liquid composition (not shown) is then dispensed into container 11 containing wick-clip 12 and metal core wick 13. As discussed above, the gel-forming liquid composition is usually at an elevated temperature, typically at least between about 195° F. and about 230° F., when dispensed into the container 11. Thereafter, the composition in the container is cooled to form a gel candle.

The preferred practice has been to use metal core wicks in gel candles, because such wicks are capable of withstanding the high temperatures during the filling process. Non-metal core wicks have generally not been used, because they have a strong tendency to bend or wilt in high temperature mediums, thereby resulting in gel candles with off-centered or submerged wicks. Off-centered wicks can lead to cracking of the candle container during burning, due to the closer proximity of the flame to the container wall.

Several drawbacks, however, are associated with using metal core wicks in gel candles. By definition, a metal core wick is a rigid wick, and therefore, burns in a mostly vertical direction in the coldest, center region of the flame. As used herein, "rigid wick" is synonymous with a metal core wick; whereas "less rigid wick" is synonymous with a non-metal core wick. Burning of wicks in the coldest regions of the flame leads to three specific problems. First, a smaller flame size results, which can be aesthetically unpleasing. Second, undesirable-looking charred portions of the wick fall into the liquid pool of gel that forms around the burning wick, due to the incomplete burning of the wick in the coldest regions of the flame. Third, these charred portions sometimes can accumulate around the wick throughout the candle life, resulting in a pile of charred wick portions capable of flaring up and/or creating excessive heat during the last hours of candle usage. These charred portions are also aesthetically unpleasing.

Non-metal core wicks avoid the drawbacks associated with metal core wicks, because non-metal core wicks, being less rigid, bend into the hotter parts of the flame during burning. However, as mentioned above, current gel candle manufacturing processes result in non-metal core wicks being bent, wilted, or submerged in gel candle bodies. Although this problem could be resolved to an extent on a small scale if the wick were physically held in the proper place, this solution is not feasible if gel candles are being mass-produced.

U.S. Pat. No. 5,578,089 (the '089 patent) relates to clear gel candle compositions. The '089 patent briefly discusses a method of making gel candles and mentions generally that a wick is placed in a candle body before the gel firms up. This patent, however, does not disclose or suggest how to produce a gel candle containing a non-metal core wick that is not bent, wilted, or submerged in the candle body.

It is desirable, therefore, to produce a gel candle having a non-metal core wick that stands upright in the candle body. By standing upright, we mean that the wick is located in substantial alignment with a longitudinal axis running through the candle container. Preferably, the longitudinal axis runs through the center of the candle container.

SUMMARY OF THE INVENTION

An object of this invention is to provide a method of manufacturing gel candles having less rigid, non-metal core wicks that stand upright and are not bent, wilted, or submerged in the candle body.

In one aspect, our invention includes a method of manufacturing a gel candle having a non-metal core wick, comprising the steps of providing a gel-forming liquid composition in a candle container having a longitudinal axis running therethrough, the gel-forming liquid composition having an average temperature of between about 195° F. and about 230° F., preferably between about 200° F. and about 220° F.; thereafter, inserting a wick-clip having a non-metal core wick into the composition in the container when the temperature of the composition substantially in the center of the container is between about 160° F. and about 195° F., preferably between about 175° F. and about 190° F.; and drawing the wick-clip through and positioning the wick-clip in the composition in the container using a magnetic material, wherein, after the positioning step, the non-metal core wick is substantially aligned with the longitudinal axis of the container.

In another aspect of this invention, a method of manufacturing a gel candle having a non-metal core wick comprises the steps of providing a gel-forming liquid composition in a candle container having a longitudinal axis running therethrough, the gel-forming liquid composition having an average temperature of between about 195° F. and about 230° F., preferably between about 200° F. and about 220° F.; thereafter, inserting a wick-clip having a non-metal core wick into the composition in the container before the composition in the container begins to transform into a gel state; and drawing the wick-clip through and positioning the wick-clip in the composition in the container using a magnetic material, wherein, after the positioning step, the non-metal core wick is substantially aligned with the longitudinal axis of the container.

In still another aspect, this invention includes a method of manufacturing a gel candle having a non-metal core wick, the method comprising the steps of providing a gel-forming liquid composition in a candle container having a longitudinal axis running therethrough, the liquid composition having an average temperature of between about 195° F. and about 230° F., preferably between about 200° F. and about 220° F.; cooling the composition in the container to a temperature between about 160° F. and about 195° F., preferably between about 175° F. and about 190° F. substantially in the center of the container; after the cooling step, inserting a wick-clip having a non-metal core wick into the composition in the container before the composition in the container begins to transform into a gel state; and drawing the wick-clip through and positioning the wick-clip in the composition in the container using a magnetic material, wherein, after the positioning step, the non-metal core wick is substantially aligned with the longitudinal axis of the container.

In yet another method of manufacturing a gel candle having non-metal core wick, after a step of providing a gel-forming liquid composition in a candle container having a longitudinal axis running therethrough, a guide is placed on the container for guiding a non-metal core wick through the gel-forming liquid composition. The guide has an inner wall that creates an opening through which the wick-clip having a non-metal core wick may be inserted. Thereafter, the wick-clip having a non-metal core wick is inserted through the opening of the guide and into the composition in the container before the composition in the container begins to transform into a gel state. The wick-clip can then be drawn through and positioned in the composition in the container using a magnetic material.

Other aspects of this invention will be better understood and advantages thereof more apparent in view of the following detailed description of the preferred embodiments and the accompanying drawings.

DETAILED DESCRIPTION OF THE PREFERRED EMBODIMENTS

Figure 2:
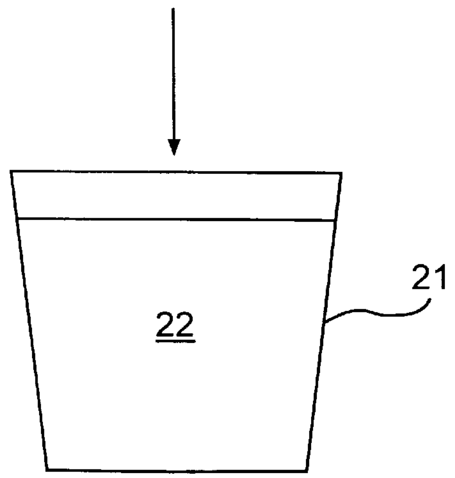
FIGS. 2(*a*) and 2(*b*) depict a method of manufacturing a gel candle according to an embodiment of the present invention.
Figure 2:
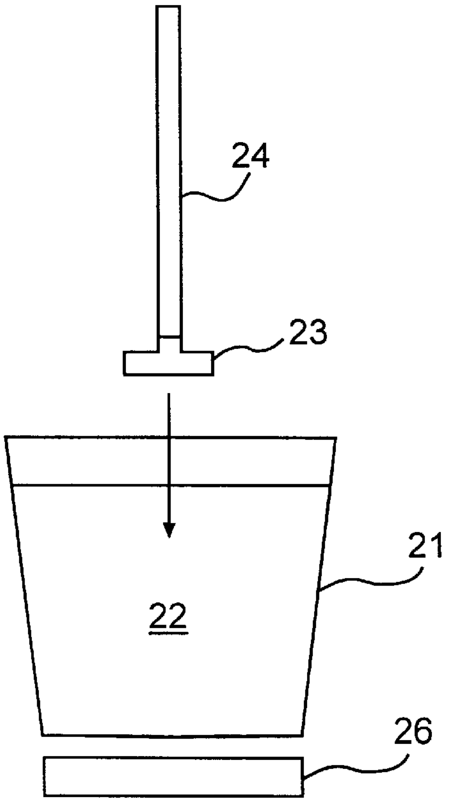

FIGS. 2(*a*) and 2(*b*) depict an embodiment of our novel method of producing a gel candle having a less rigid, non-metal core wick that stands upright and is not bent, wilted, or submerged in the candle body. Referring now to FIG. 2(*a*), a candle container 21 is first filled with a gel-forming liquid composition 22. The temperature of liquid composition 22, at its introduction thereof, is between about 195° F. and about 230° F., and preferably between about 200° F. and 220° F., but will vary within these ranges depending on the composition used. As discussed above, during the filling process, liquid composition 22 is dispensed from a batch vessel, and therefore, must be maintained in the batch vessel at a temperature high enough to prevent gellation in the batch itself.

Referring to FIG. 2(*b*), a wick-clip 23 having a non-metal core wick 24 is then inserted into liquid composition 22 filled in container 21. A magnetic material 26 draws wick-clip 23 having non-metal core wick 24 through the liquid composition 22 in container 21 and positions wick-clip 23 having non-metal core wick 24 in container 21, and upon cooling of liquid composition 22, a gel candle is formed. As used herein, "magnetic material" refers to any material capable of generating a sufficiently strong magnetic field as will be discussed in more detail below.

Our method is not limited to particular gel-forming liquid compositions, candle containers, and non-metal core wicks. Any suitable composition, container, or non-metal core wick may be used.

In practicing our invention, the only requirement is that the wick-clip 23 having the non-metal core wick 24 must be inserted after the container 21 is filled with liquid composition 22. We have found that by adding wick-clip 23 and non-metal core wick 24 after the container is filled, it is possible to produce a gel candle having a non-metal core wick that stands upright in substantial alignment with a longitudinal axis running through the container 21. Preferably, the non-metal core wick stands upright in substantial alignment with a longitudinal axis that runs through the center of the candle container 21. This result is unexpected, because the non-metal core wick 24 is still exposed to high temperatures, even though it is added after the liquid composition 22 is poured into the candle container 21.

The wick-clip 23 having the non-metal core wick 24 is inserted into and drawn through the liquid composition 22 in container 21 when the center of liquid composition 22 in container 21 is preferably at a temperature between about 160° F. and about 195° F., and more preferably between about 175° F. and about 190° F. Thus, liquid composition 22 in container 21 may be subjected to a cooling step, or alternatively, may be allowed to cool, for a period of time before insertion of wick-clip 23. The cooling step may continue, during and after the insertion and drawing of wick-clip 23, as desired, until a gel candle is formed. Various cooling modes known in the art, such as cooling tunnels, as well as ambient or forced convection, may be employed.

In another preferred embodiment, wick-clip 23 having non-metal core wick 24 is inserted and drawn before the liquid composition 22 begins to gel (i.e., before the liquid composition begins to transform into a gel state). The transformation into a gel state is characterized by the initial formation of a gel state on the outer edges of the candle container 21.

In still another preferred embodiment of our invention, wick-clip 23 having non-metal core wick 24 may also be inserted up to a point at which a region of the liquid composition is still sufficiently fluid (i.e., not in a gel state) to allow insertion, drawing and positioning of the wick-clip 23 and the non-metal core wick 24 into an upright position in the resulting gel candle body. We have found that the lowest temperature at which a region of gel-forming liquid composition can be cooled, before the region begins to transform into a gel state, is about 140° F.

The wick-clip 23 may comprise any material capable of being attracted by a magnetic field generated by magnetic material 26. We prefer to use metal wick-clips. Wick-clips may also be composed of any paramagnetic material (i.e., a material having a positive magnetic susceptibility, where magnetic susceptibility is defined as the-ratio of induced magnetization of the material to magnetic field intensity).

The magnetic material 26 may be of any size and shape, provided it generates a magnetic field intensity strong enough to attract (i.e., draw) the wick-clip 23 having the non-metal core wick 24 through the liquid composition 22. We have found the optimal range of magnetic field intensity to be from about $10^{-3}$ to about 2 Tesla. We prefer to use magnets, specifically bar magnets, as the magnetic material 26. We recognize, however, that electromagnets and equivalent devices could also be used.

Figure 3:
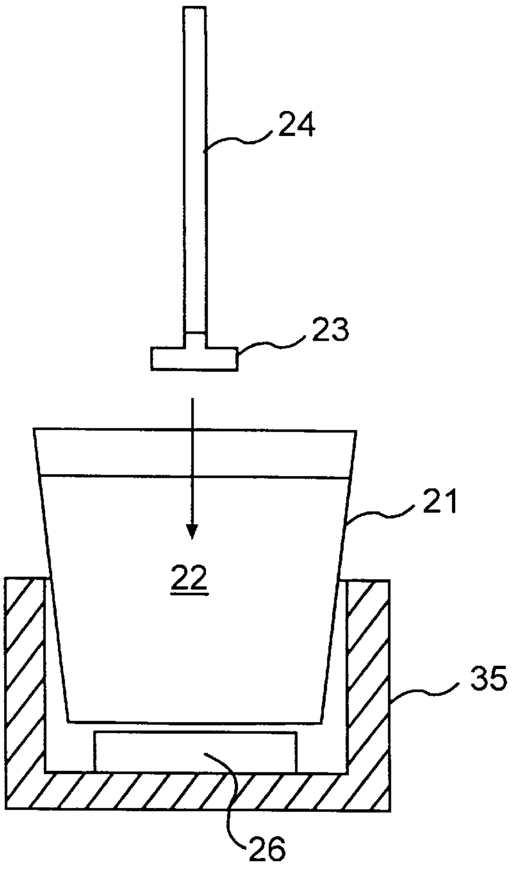
FIG. 3 depicts a method of manufacturing a gel candle according to another embodiment of this invention.

The magnetic material 26 may be located at any position relative to the container 21, provided again that the magnetic field intensity generated is strong enough to attract (i.e., draw) the wick-clip 23 having the non-metal core wick 24 through the liquid composition 22. In a preferred embodiment, the magnetic material 26 is located external to the container and is contained in a puck 35 or like container, as depicted in FIG. 3. Candle container 21 containing a gel-forming liquid composition 22 sits in the puck 35, and magnetic material 26 draws the wick-clip 23 having the non-metal core wick 24 through and positions the wick-clip 23 having the non-metal core wick 24 in the liquid composition 22 in the candle container 21.

In another embodiment, the magnetic material may merely be arranged to be contiguous with an outside surface of the container 21, such as the bottom outside surface, by a supporting arrangement other than puck 35.

Figure 4:
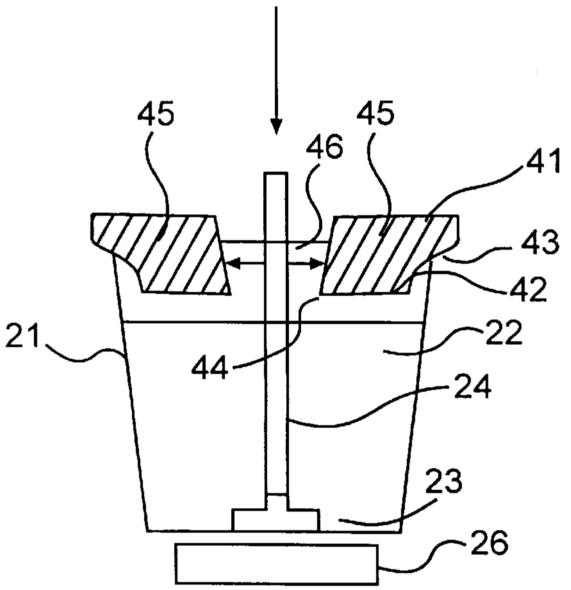
FIG. 4, a partial cross-sectional view, depicts a method of manufacturing a gel candle using a guide, according to another embodiment of the present invention.

FIG. 4 illustrates a most preferred embodiment of a method of manufacturing a gel candle of this invention. In this embodiment, as a first step, a gel-forming liquid composition 22 is provided in a candle container 21, preferably at temperatures between about 195° F. and about 230° F., and more preferably between about 200° F. and about 220° F. Then, a guide 45 is placed on the container 21. We recognize, however, that the guide 45 can be placed on the container 21, which is then filled with gel-forming liquid composition 22. In either case, the guide 45 has an inner wall 44 that creates an opening 46 preferably having a width that is greater than the width of a wick-clip 23, an upper surface 41, a lower surface 42, and an outer wall 43. The opening 46 need not be round or take on a different specific shape, but rather can take on any shape according to the inner wall 44 of the guide 45. We prefer that the inner wall 44 of the guide 45 be sloped such that the opening 46 of the guide 45 reduces in size as the inner wall 44 extends from the upper surface 41 to the lower surface 42. The outer wall 43 is tapered to conform to the shape of the container 21. Thereafter, the wick-clip 23 having a non-metal core wick 24 is inserted through the opening 46 of the guide 45, and into the gel composition 22. Preferably, the non-metal core wick 24 is inserted when the temperature of the gel composition 22 is below about 300° F., but before the gel composition 22 in the container 21 begins to transform into a gel state. Once the non-metal core wick 24 and wick-clip 23 are inserted, the non-metal core wick 24 preferably should have sufficient length that it extends into the opening 46 of the guide 45, such that movement of the wick 24 is restricted by the inner wall 44 of the guide 45. Finally, in the embodiment depicted in FIG. 4, the wick-clip 23 having the non-metal core wick 24 is drawn through and positioned in the composition 22 in the container 21 using magnetic material 26. We have found that the guide 45 is typically placed on the container 21 for a period of time between about 2 minutes to about 20 minutes, and preferably between about 4 minutes to about 7 minutes. By following this method, a non-metal core wick 24 may be substantially aligned with the longitudinal axis of the container 21.

To improve the efficiency, when mass producing gel candles using the embodiment depicted in FIG. 4, it is possible to join a plurality of guides 45 together into a gauge (not shown), such that an equivalent plurality of containers 21 containing liquid gel composition 22 simultaneously can have non-metal core wicks 24 attached to wick-clips 23 inserted into each container 21 of the plurality of containers. The guides can be joined to form a gauge by way of any type of connection, such as a fixed non-movable connection, or by way of a movable connection such as, for example, a hinged connection or a ball-and-socket connection.

COMPARATIVE TESTING

Figure 1:
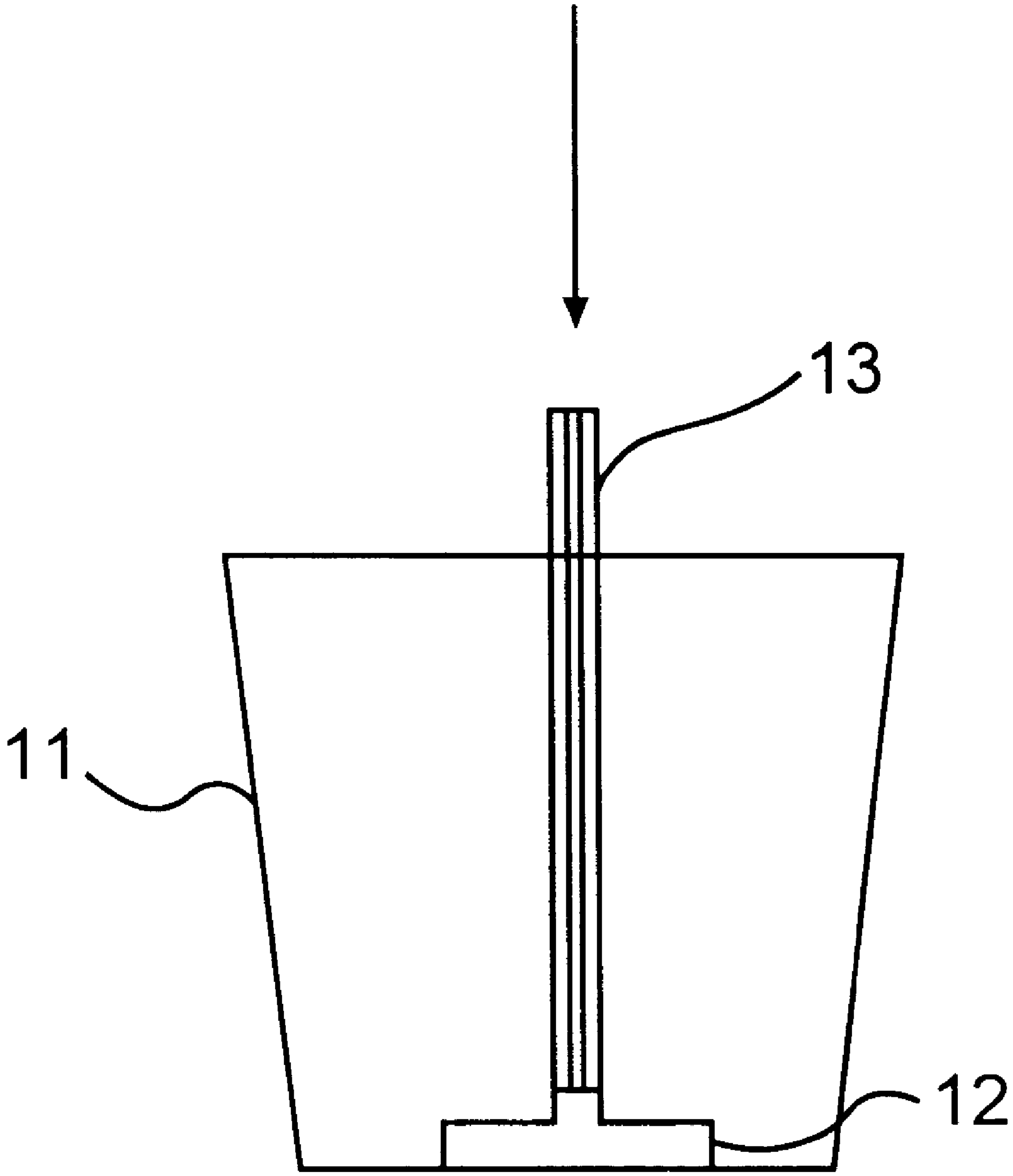
FIG. 1 PRIOR ART
FIG. 1 generally depicts the filling stage currently employed in the manufacture of gel candles.

Comparative tests were performed to demonstrate the unexpected result of a properly centered and aligned non-metal core wick achieved by our novel process. The results are displayed below in Table 1. We used Stabilo 7 non-metal core wicks (from Technische Geflechte, 41334 Nettetal-Kaldenkirchen, Germany) and P-180/6 wicks (from Wedo, 41334 Nettetal, Germany). We produced ten candles using each type of wick, in accordance with the conventional process described above with respect to FIG. 1. This is referred to as "Conventional Process" in Table 1. We then produced ten candles using each type of wick, in accordance with an embodiment of our process. The starting materials for the gel composition included hydrocarbon oil, specifically, mineral oil, triblock copolymer (or, alternatively, mixtures of diblock copolymer and triblock copolymer could be used) and fragrance. The mineral oil was heated up to 280° F. Triblock Copolymer (e.g., KRATON® G) was added to the mineral oil. KRATON® is a registered trademark of Shell Oil Co. (i.e., Reg. No. 794,983). The mixture was stirred until the triblock copolymer was dissolved in the mineral oil. The temperature of the mixture was lowered to between about 230° F. and about 250° F. Fragrance and dye were then added to the mixture, and the mixture was agitated until it was homogeneous. Glass jars were then filled with the mixture at temperatures between about 200° F. and about 220° F. Finally, a wick-clip having a non-metal core wick was inserted into the glass jar containing the mixture at a temperature between about 175° F. and about 190° F., and the wick-clip was drawn through and positioned in the glass jar containing the mixture using a bar magnet such that the bar magnet was substantially aligned with the longitudinal axis of the glass jar. This process is referred to as "Embodiment A" in Table 1. Glass jars having an opening diameter of about 2.5 inches were used as the candle containers.

TABLE 1

| Process | Stabilo 7 Wick | P-180/6 Wick |
|---|---|---|
| Conventional Process | 7 candles had wicks touching the side of the container (complete bend) | 5 candles had wicks touching the side of the container (complete bend) |
| | 3 candles had wicks that were less than 0.5 inch away from the side of the container | 5 candles had wicks that were less than 0.5 inch away from the side of the container |
| Embodiment A | 10 candles had wicks that were properly centered and aligned | 10 candles had wicks that were properly centered and aligned |

Comparative tests also were carried out to test the effectiveness of using a guide to help insert a non-metal core wick in a gel candle, so as to substantially align the wick with the longitudinal axis of the container. The tests were conducted using approximately 500 candles. These tests indicated, for all 500 tests, that, as long as the temperature of the gel was such that the gel composition was in a liquid state, on the one hand, and the temperature was such that the liquid composition of the gel candle had not yet transformed into a gel state, on the other, the wicks either did not bend at all, or, if they did bend, the bending stopped once the wick touched the inner side of the guide. Therefore, the guides were found to be very useful.

INDUSTRIAL APPLICABILITY

Methods according to this invention may be used to mass produce gel candles having non-metal core wicks that stand upright and are not bent, wilted or submerged in the gel candle body.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent functions.

We claim:

1. A method of manufacturing a gel candle having a non-metal core wick, comprising the steps of:

providing a gel-forming liquid composition in an open-ended candle container having a base and a longitudinal axis running from the base to the opening of the container;:

disposing a magnetic material substantially adjacent to the base of the container;

inserting a wick-clip having a non-metal core wick into the composition in the container before the composition in the container begins: to transform into a gel state; and drawing the wick-clip through the composition toward the base of the container using the magnetic material, wherein, after said drawing step, the non-metal core wick is substantially aligned with the longitudinal axis of the container.

2. The method of claim 1, wherein the longitudinal axis runs through the center of the candle container.

3. The method of claim 1, wherein said drawing step comprises using a magnetic material located external to the container to draw the wick-clip toward the base of the container.

4. A method of manufacturing a gel candle having a non-metal core wick, comprising the steps of:

providing a gel-forming liquid composition in a candle container having a longitudinal axis running therethrough;

placing a guide on the container for guiding a non-metal core wick through the gel-forming liquid composition, wherein the guide has an inner wall that creates an opening;

thereafter, inserting a wick-clip having a non-metal core wick through the opening of the guide and into the composition in the container; and positioning the wick-clip in the composition in the container using a magnetic material, wherein, after said positioning step, the non-metal core wick is substantially aligned with the longitudinal axis of the container.

5. The method of claim 4, wherein the non-metal core wick extends into the opening of the guide once the wick has been completely inserted and positioned pursuant to the inserting step and the positioning step.

6. The method of claim 14, wherein the inner wall of the guide is angled such that the opening gradually reduces in size as the inner wall extends from an upper surface to a lower surface of the guide.

7. The method of claim 4, wherein the width of the opening of the guide is larger than the width of the wick-clip.

8. The method of claim 4, wherein said inserting step is conducted when the temperature of the liquid composition is below about 300° F., but before the liquid composition in the container begins to transform into a gel state.

9. The method of claim 4, wherein, in said providing step, the liquid composition has an average temperature of between about 195° F. and about 230° F.

10. The method of claim 9, wherein, in said providing step, the liquid composition has an average temperature of between about 200° F. and about 220° F.

11. A method of manufacturing a gel candle having a non-metal core wick, comprising the steps of:

providing a gel-forming liquid composition in an open-ended candle container having a base and a longitudinal axis running from the base to the opening of the container;

placing a guide over the opening of the container for guiding a non-metal core wick through the gel-forming liquid composition, wherein the guide has an inner wall that creates an opening which is smaller than the opening of the container;

disposing a magnetic material substantially adjacent to the base of the container;

inserting a wick-clip having a non-metal core wick through the opening of the guide and into the composition in the container; and drawing the wick-clip through the composition toward the base of the container using the magnetic material, wherein, after said drawing step, the non-metal core wick is substantially aligned with the longitudinal axis of the container.

12. The method of claim 11, wherein the non-metal core wick extends into the opening of the guide once the wick has been completely inserted and drawn pursuant to the inserting step and the drawing step.

13. The method of claim 11, wherein the inner wall of the guide is angled such that the opening gradually reduces in size as the inner wall extends from an upper surface to a lower surface of the guide.

14. The method of claim 11, wherein the width of the opening of the guide is larger than the width of the wick-clip.

15. The method of claim 11, wherein said inserting step is conducted when the temperature of the liquid composition is below about 300° F, but before the liquid composition in the container begins to transform into a gel state.

16. The method of claim 11, wherein, in said providing step, the liquid composition has an average temperature of between about 195° F. and about 230° F.

17. The method of claim 16, wherein, in said providing step, the liquid composition has an average temperature of between about 200° F. and about 220° F.

18. A method of manufacturing a gel candle having a non-metal core wick, comprising the steps of:

providing a gel-forming liquid composition in an open-ended candle container having a base and a longitudinal axis running from the base to the opening of the container, the gel-forming liquid composition having an average temperature of between about 195° F. and about 230° F.;

disposing a magnetic material substantially adjacent to the base of the container;

inserting a wick-clip having a non-metal core wick into the composition in the container before the composition in the container begins to transform into a gel state; and drawing the wick-clip through the composition toward the base of the container using the magnetic material, wherein, after said drawing step, the non-metal core wick is substantially aligned with the longitudinal axis of the container.

19. The method of claim 18, wherein the gel-forming liquid composition has an average temperature of between about 200° F. and about 220° F.

20. The method of claims 18, or 19, wherein the longitudinal axis runs through the center of the candle container.

21. The method of claims 18, or 19, wherein said drawing step comprises using a magnetic material located external to the container to draw the wick-clip toward the base of the container.

22. A method of manufacturing a gel candle having a non-metal core wick, comprising the steps of:

providing a gel-forming liquid composition in an open-ended candle container having a base and a longitudinal axis running from the base to the opening of the container, the gel-forming liquid composition having an average temperature of between about 195° F. and about 230° F.;

disposing a magnetic material substantially adjacent to the base of the container;

inserting a wick-clip having a non-metal core wick into the composition in the container when the temperature of the composition substantially in the center of the container is between about 160° F. and about 195° F.; and drawing the wick-clip through the composition toward the base of the container using the magnetic material, wherein, after said drawing step, the non-metal core wick is substantially aligned with the longitudinal axis of the container.

23. A method of manufacturing a gel candle having a non-metal core wick, comprising the steps of:

providing a gel-forming liquid composition in an open-ended candle container having a base and a longitudinal axis running from the base to the opening of the container, the gel-forming liquid composition having an average temperature of between about 200° F. and about 220° F.;

disposing a magnetic material substantially adjacent to the base of the container;

inserting a wick-clip having a non-metal core wick into the composition in the container when the temperature of the composition substantially in the center of the container is between about 175° F. and about 190° F.; and drawing the wick-clip through the composition toward the base of the container using the magnetic material, wherein, after said drawing step, the non-metal core wick is substantially aligned with the longitudinal axis of the container.

24. The method of claims 22, or 23, wherein the longitudinal axis runs through the center of the candle container.

25. The method of claims 22, or 23, wherein said positioning step comprises using a magnetic material located external to the container to position the wick-clip in the container.

26. The method of claims 22, or 23, wherein said drawing step comprises positioning the magnetic material contiguous with the base of the container to draw the wick-clip toward the base of the container.

27. A method of manufacturing a gel candle having a non-metal core wick, comprising the steps of:

providing a gel-forming liquid composition in an open-ended candle container having a base and a longitudinal axis running from the base to the opening of the container, the liquid composition having an average temperature of between about 195° F. and about 230° F.;

disposing a magnetic material substantially adjacent to the base of the container;

cooling the composition in the container to a temperature between about 160° F. and about 195° F. substantially in the center of the container;

after said cooling step, inserting a wick-clip having a non-metal core wick into the composition in the container before the composition in the container begins to transform into a gel state; and drawing the wick-clip through the composition toward the base of the container using the magnetic material, wherein, after said drawing step, the non-metal core wick is substantially aligned with the longitudinal axis of the container.

28. A method of manufacturing a gel candle having a non-metal core wick, comprising the steps of:

providing a gel-forming liquid composition in an open-ended candle container having a base and a longitudinal axis running from the base to the opening of the container, the liquid composition having an average temperature of between about 200° F. and about 220° F.;

disposing a magnetic material substantially adjacent to the base of the container;

cooling the composition in the container to a temperature between about 175° F. and about 190° F. substantially in the center of the container;

after said cooling step, inserting a wick-clip having a non-metal core wick into the composition in the container before the composition in the container begins to transform into a gel state; and drawing the wick-clip through the composition toward the base of the container using the magnetic material, wherein, after said drawing step, the non-metal core wick is substantially aligned with the longitudinal axis of the container.

29. The method of claims 27 or 28, wherein the longitudinal axis runs through the center of the candle container.

* * * * *